United States Patent
Irwin et al.

(10) Patent No.: US 6,242,877 B1
(45) Date of Patent: *Jun. 5, 2001

(54) CONTROL SYSTEM AND METHOD FOR CYCLE-BASED PROCESSES

(75) Inventors: Jere F. Irwin; Gary A. Curry, both of Yakima; Marian J. Fisk, Naches; Andrew Roy, Yakima; David L. Roberts; Stephanie L. Roberts, both of Vancouver; Todd W. Rudberg, Snohomish, all of WA (US)

(73) Assignee: The Vision Limited Partnership, Yakima, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/383,035

(22) Filed: Aug. 25, 1999

Related U.S. Application Data

(63) Continuation of application No. 09/011,755, filed as application No. PCT/US96/14096 on Aug. 28, 1996, now Pat. No. 6,084,375
(60) Provisional application No. 60/003,169, filed on Sep. 1, 1995, now abandoned.

(51) Int. Cl.⁷ ........................................ H02P 1/04
(52) U.S. Cl. ............................ 318/557; 318/556
(58) Field of Search .................. 318/560, 556–557; 364/464

(56) References Cited

U.S. PATENT DOCUMENTS

| | | | |
|---|---|---|---|
| 4,319,289 | 3/1982 | Ravizza | 360/77 |
| 4,630,210 * | 12/1986 | Salazar et al. | 364/464 |
| 5,121,327 | 6/1992 | Salazar | 318/696 |
| 5,533,184 | 7/1996 | Malcolm | 395/161 |
| 5,804,779 * | 1/1999 | Fargo | 187/316 |
| 5,859,395 * | 1/1999 | Fargo | 187/316 |

* cited by examiner

Primary Examiner—Robert E. Nappi
Assistant Examiner—Rita Leykin
(74) Attorney, Agent, or Firm—Wells, St. John, Roberts, Gregor & Matkin, P.S.

(57) ABSTRACT

An apparatus for controlling operation of a processing machine has a computer preferably with a computer aided design program configurable to model a kinematic velocity profile of a point of interest on a machine to be controlled. A graphical user interface on the computer enables an operator to select desired velocity points for a motor drive controlling motion of the point on the machine. A curve fit is applied to the velocity points to realize a desired velocity profile for the motor drive and the point on the machine. The desired velocity profile is then integrated and scaled in order to obtain a scaled velocity profile that realizes an actual, or target displacement of the point as dictated by operation of the machine. By controlling operation of elements of a machine with velocity profiles, coordination of associated elements and points on the machine can be visualized by an operator selecting the velocity points for each drive of the machine. A method for implementing same is also disclosed.

7 Claims, 8 Drawing Sheets

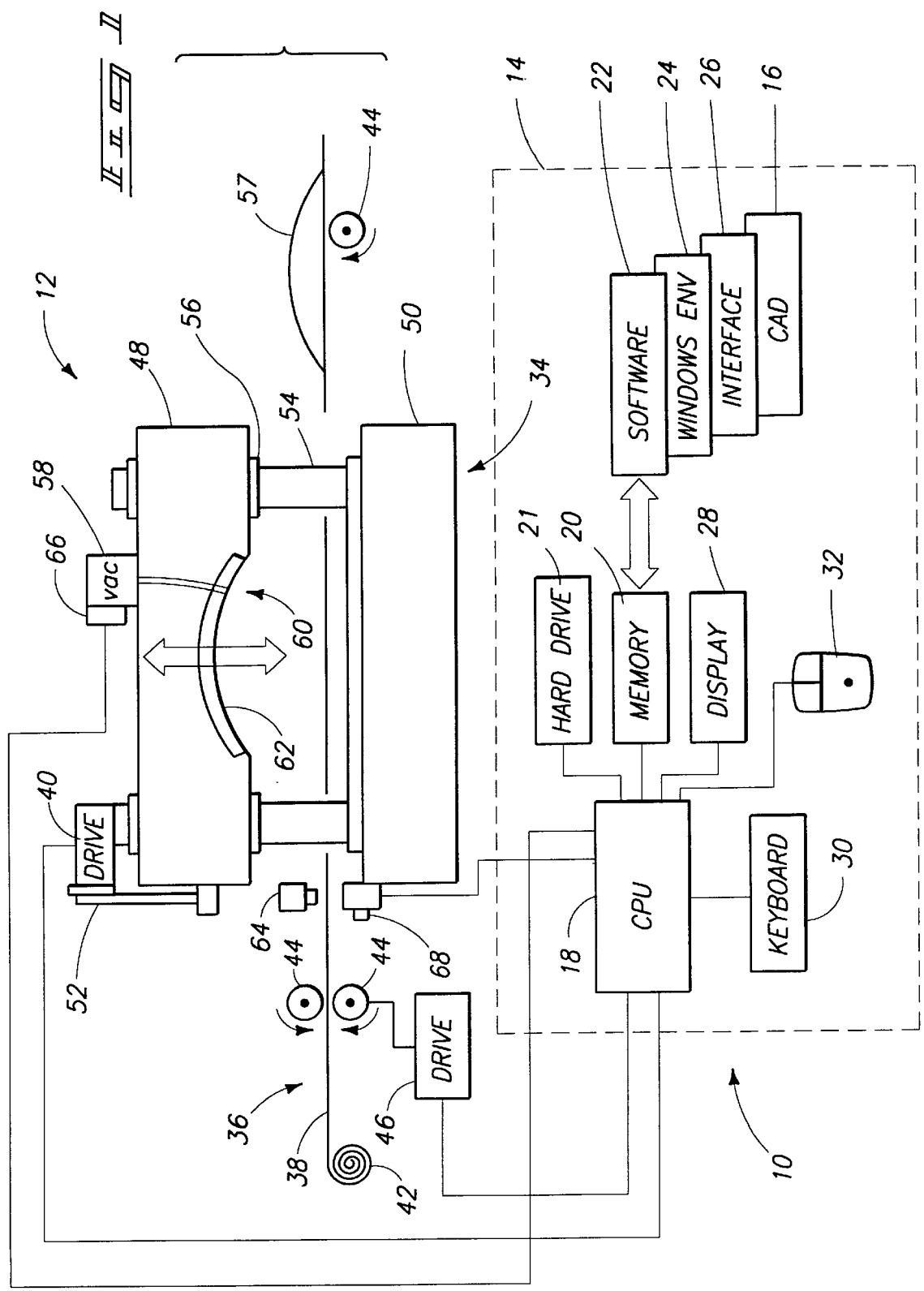

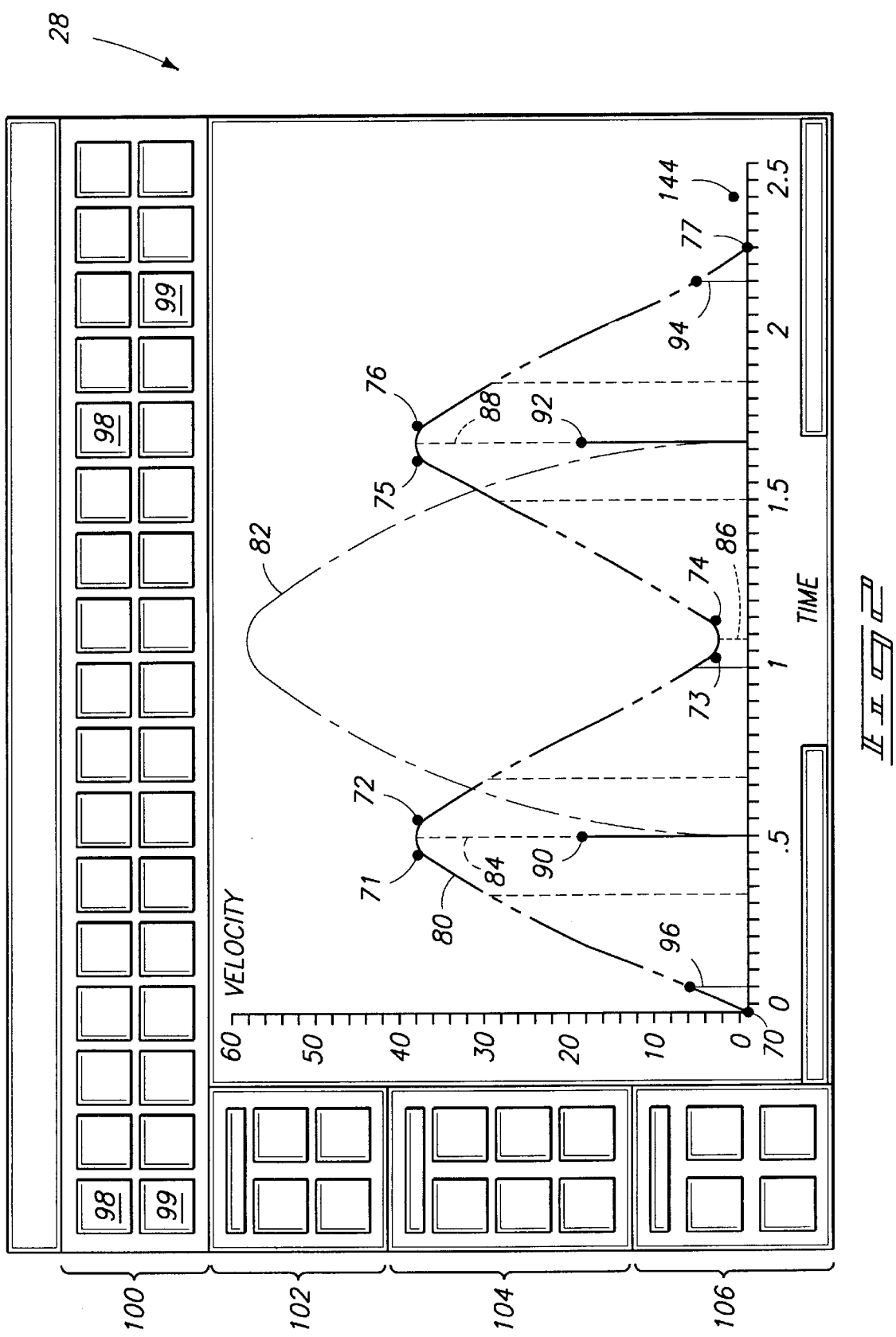

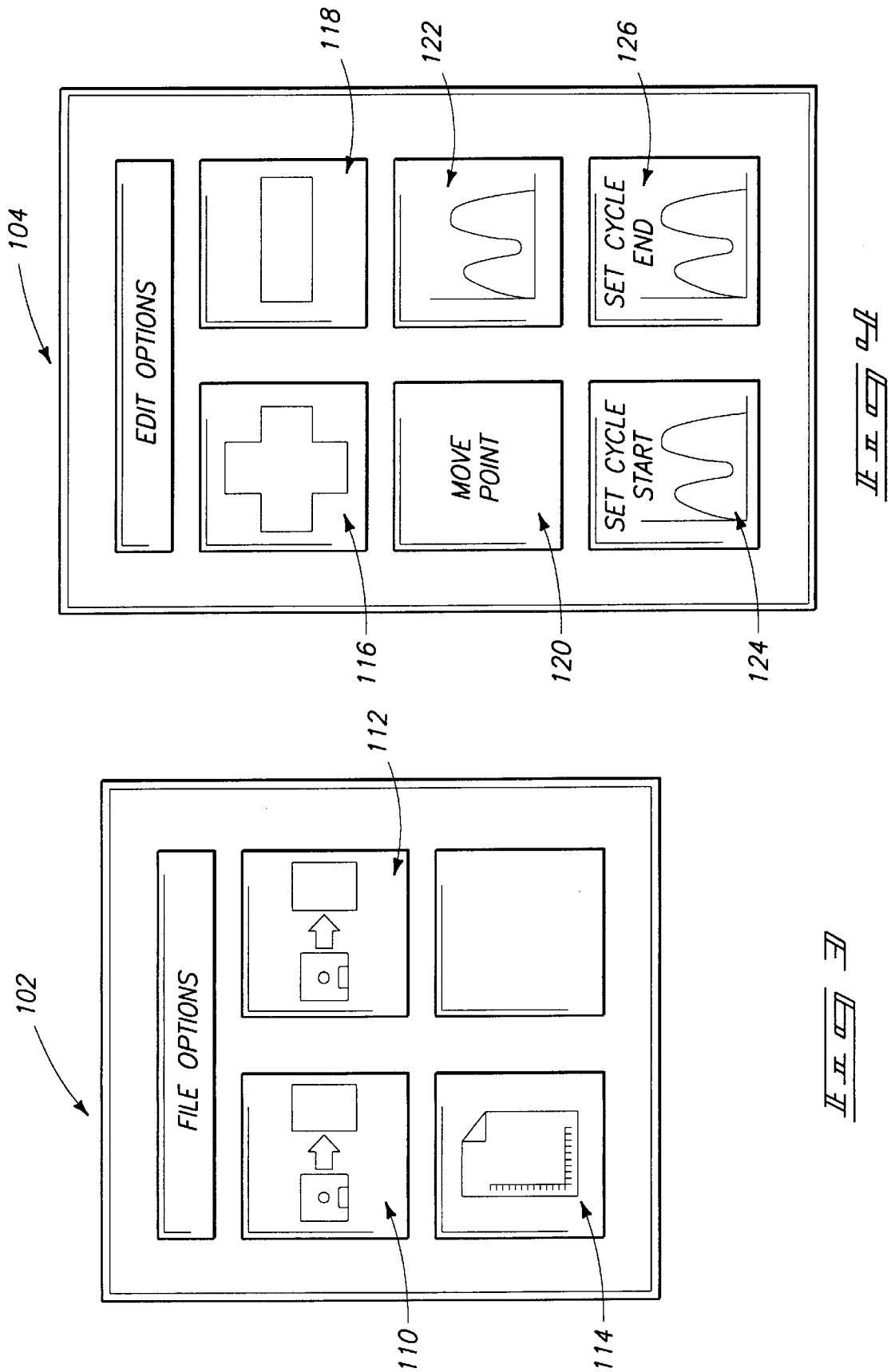

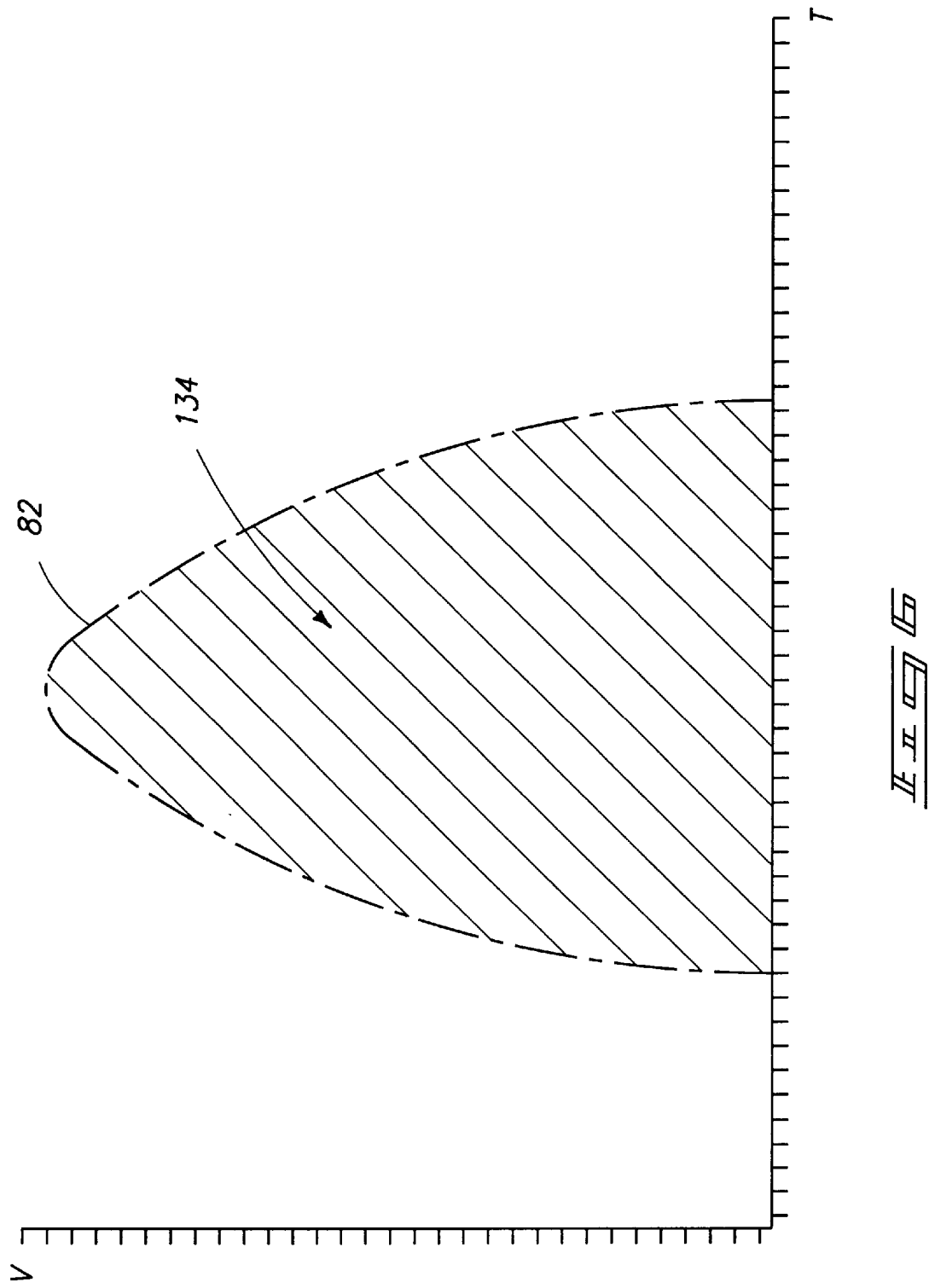

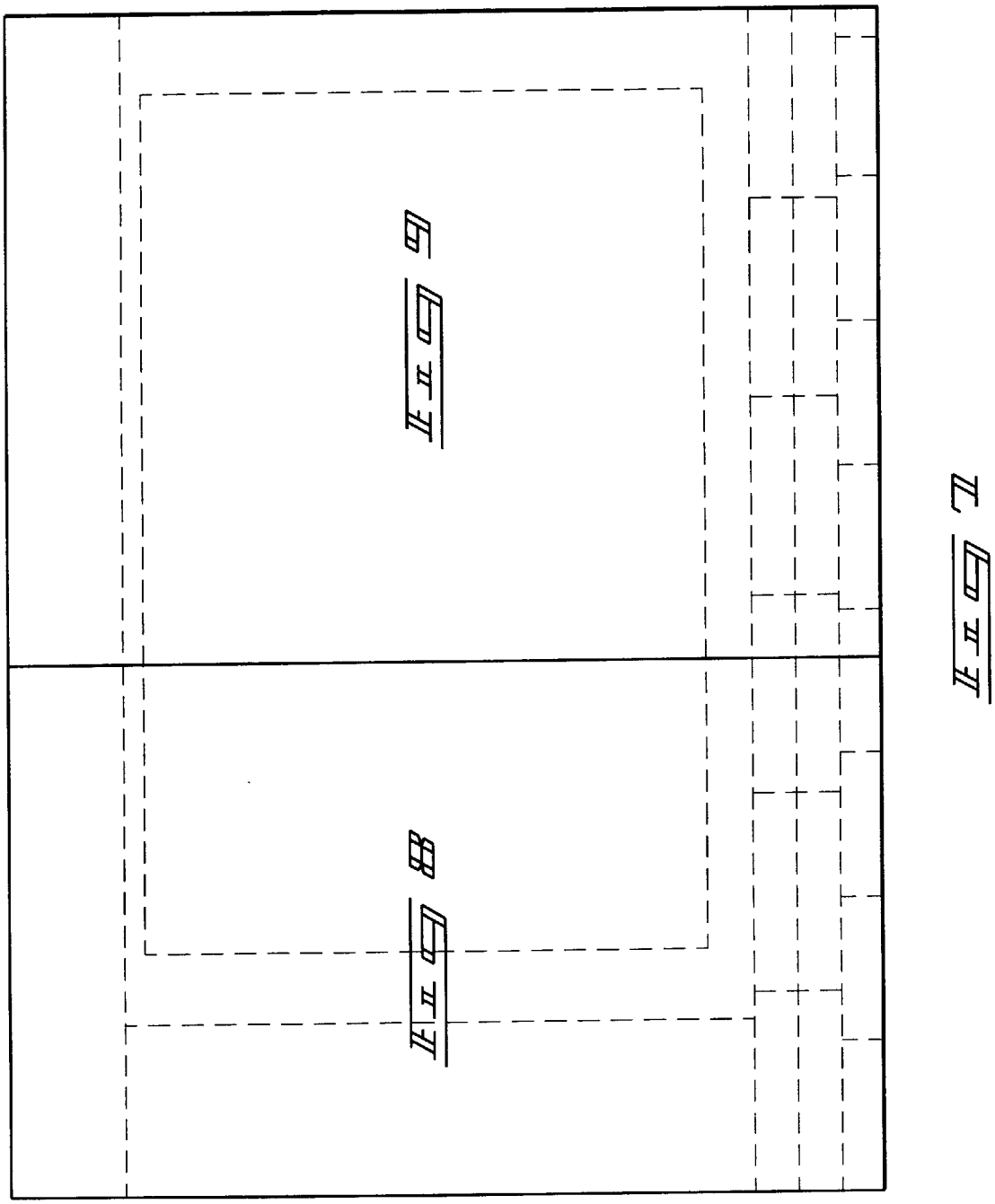

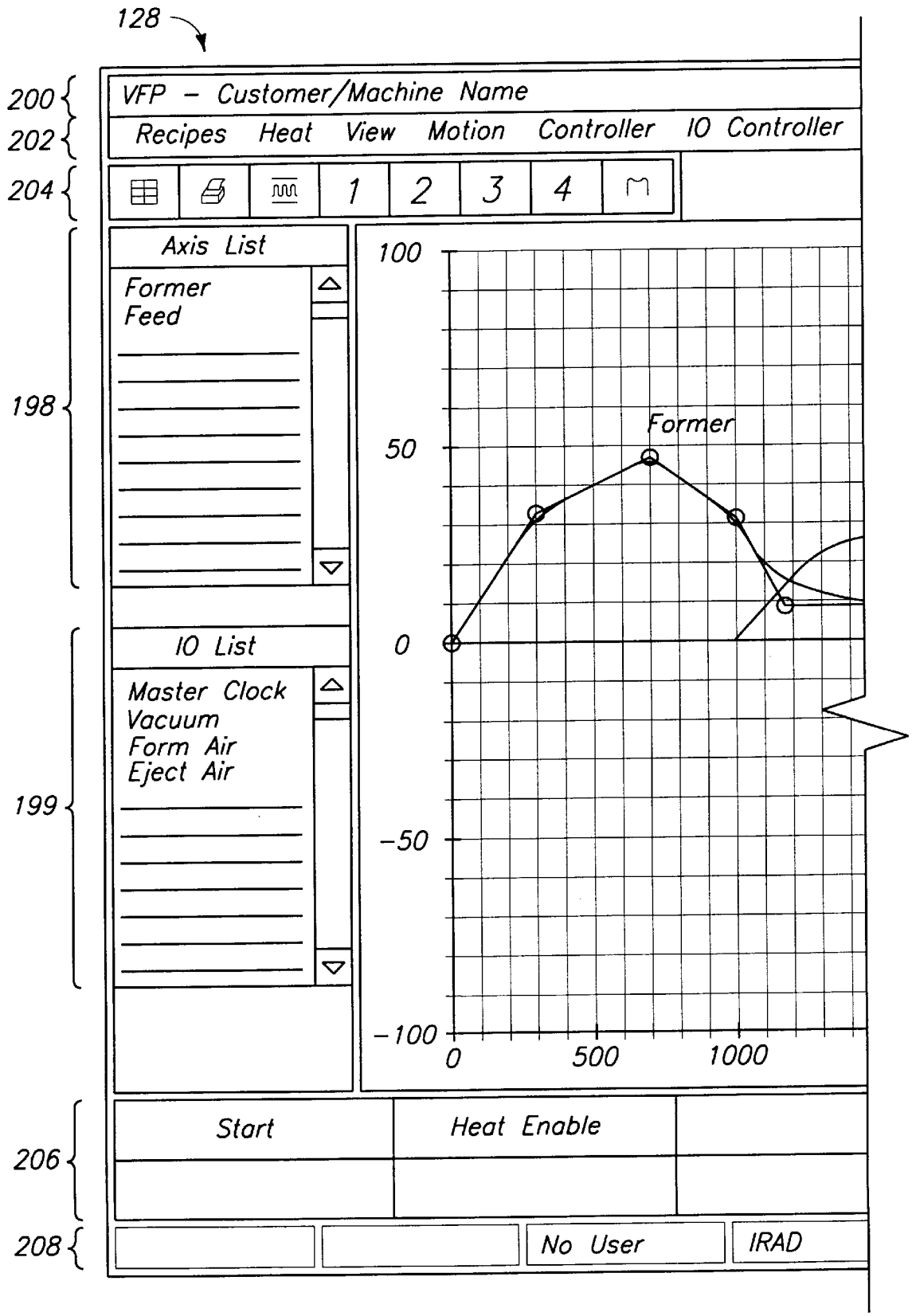

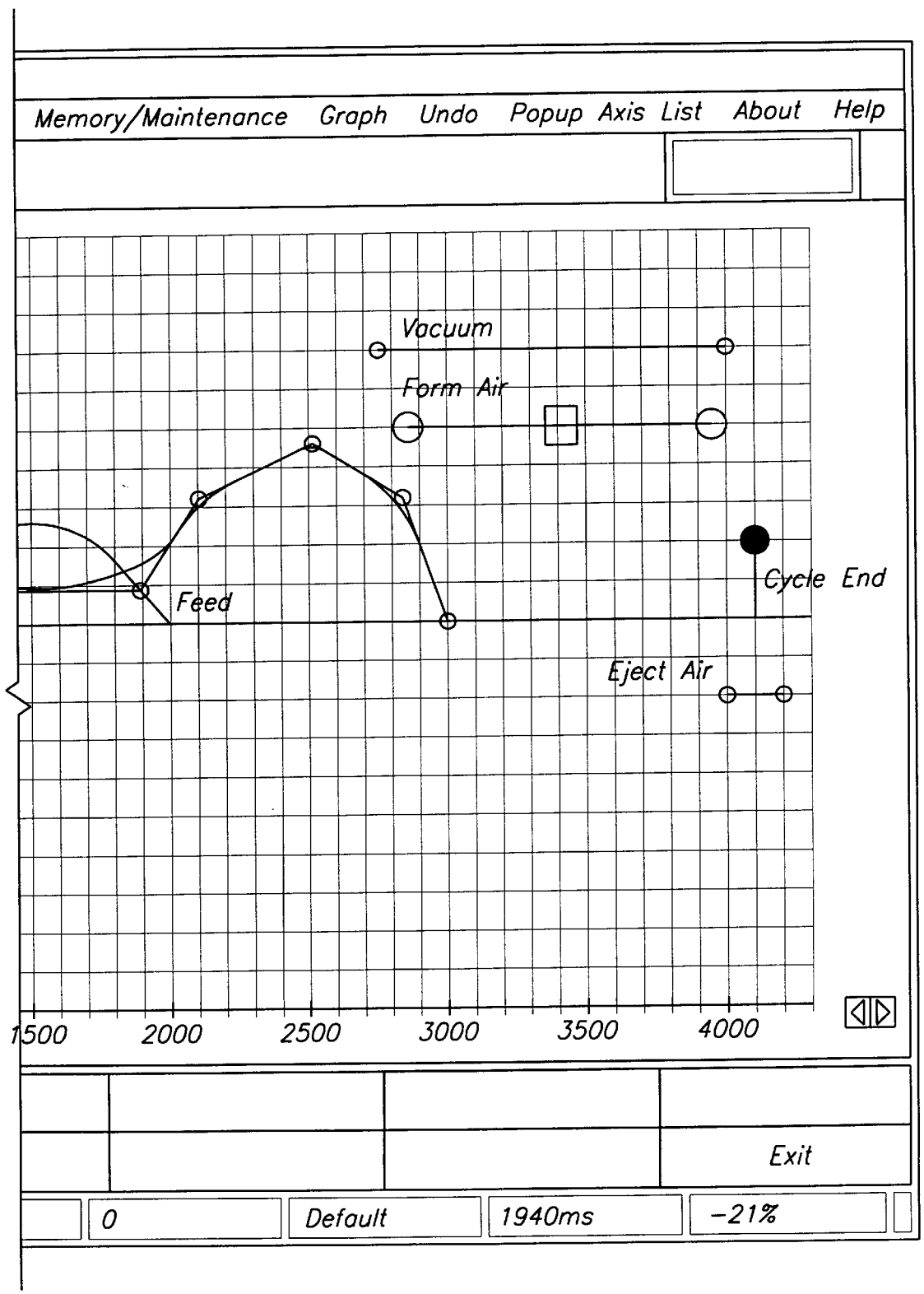

CONTROL SYSTEM AND METHOD FOR CYCLE-BASED PROCESSES

RELATED PATENT DATA

This patent resulted from a continuation application of U.S. patent application Ser. No. 09/011,755, filed May 8, 1998, which is now U.S. Pat. No. 6,084,375 which is a U.S. National Phase Application of PCT Application Ser. No. PCT/US96/14096, filed Aug. 28, 1996, which is published PCT International Application WO 97/09547, which claims priority on U.S. Provisional Patent Application No. 60/003, 169, filed on Sep. 1, 1995, now abandoned.

TECHNICAL FIELD

This invention relates to control of multiple drive/multiple output machines for cycle based processes.

BACKGROUND ART

A variety of increasingly sophisticated mechanisms and control systems are now being used in manufacturing, processing, and handling industries to automatically control parts-handling and forming machines. Many of these machines utilize complicated mechanisms to feed and process materials. Furthermore, there exist many different mechanisms to feed, sort, convey, manipulate, and/or form materials. In some cases, all these features are provided in a single machine capable of fast and efficient operation. Such sorting, feeding, work handling and processing mechanisms typically utilize drive control systems to articulate complex kinematic linkages in order to move working elements of the machine to desired positions. A drive control system includes an electric motor, such as an AC servomotor, and a servo drive motor controller. However, for the case of a multiple mechanism machine it becomes necessary to choreograph operation of each drive and element. Such a combination of mechanisms provides a multiple drive/ multiple output machine suitable for a number of cycle based processes. Typically, a control system directs operation of the drive controls to impart desirable cooperative motions to all of the linkages. In this manner, a part can be manipulated through a series of operating steps.

One way of imparting desirable kinematic properties to a multiple drive/multiple output machine is to design each mechanism with combinations of kinematic linkages that have well-understood properties. Ratchets, cams, gears, chain and sprocket drives, linkages, toggles, and various coupling devices are typically used to create a linkage that produces a desired displacement-based movement of a part or element. For example, a Watts linkage is one device utilized to produce a substantially straight line motion of an element in a machine. Various other exemplary linkages are known for producing straight-line, or nearly straight-line motion. Additionally, other similar linkage designs are known for producing desired arcuate, circular, and rotary motions of a machine element. However, a machine having single dedicated motion cannot be easily modified in order to suit a particular desired machine application.

Another way of imparting desirable kinematic properties to a multiple drive/multiple output machine is to utilize robotic arms to form each moving mechanism. Such arms are capable of manipulating an element or part according to nearly any desired path of motion. Additionally, the robotic arms can usually be easily reprogrammed. Typically, a computerized control system directs operation of the robotic arm, enabling production of such a desired path-wise motion. Such robotic machines are choreographed according to a desired path-wise, or position-based motion of each mechanism. In this manner, clearance between elements during an operation can be ensured. Furthermore, desired positioning of a part being operated on can be ensured, in relation to a machine element doing the operating. However, robotic arms are not well suited for machines using repetitive cycle-based processes.

One problem encountered with utilizing kinematic linkages to position a working element is the inability to vary the positioning of the element or part over time and distance without redesigning the linkage. Redesign of the linkages typically takes a significant amount of machine setup time. For example, a cam on a cam follower mechanism must typically be changed in order to vary kinematic characteristics of a particular machine element using the cam follower mechanism. The only possible variation available is to speed up or slow down operation of the cam, which complicates control of the device. However, movement is still directly related to the shape of the cam, which remains the same. Therefore, there is a need to better control kinematics of machine elements in a way that allows for relative changes in velocity of the element or part over time. Furthermore, there is a need to control elements of a machine based on the velocities of each element in order to produce smooth contacts between parts, and smooth transitions between processing steps being performed by a machine.

Another problem encountered with utilizing kinematic linkages to position a working element is the complexity needed to produce a desired motion, especially when it is necessary to vary velocity of the element. For example, an indexing mechanism can be formed from an epicyclic gear and a cam. In such a construction, a planetary wheel and a cam are fixed relative to one another. A carrier is rotated around the fixed wheel at a uniform speed. An index arm is supported at one point along the carrier, and at another point along the follower. The arm moves relative to the cam, along the follower to produce a non-uniform motion of the arm, having dwell periods. However, such a linkage proves rather complicated for producing a specific non-uniform rotary motion of the arm.

A further problem is encountered when utilizing robotic arms to position a working element of a multiple drive/ multiple output machine because a complex control scheme is needed to choreograph timing and motions of each robotic arm. Typically, motion studies must be made with mocked-up machines in order to ensure desired placement of each robot arm with respect to the other arms of the machine.

Yet another problem with utilizing robotic arms on a machine results from the relatively high cost of configuring a multiple drive/multiple output machine. A typical robotic arm has up to six degrees of freedom, with as many as six independently operable solenoid motors configured to articulate the arm to desired positions. Target positions are used to choreograph the positioning of each arm over time. However, it is difficult, if not impossible, to configure motion of each robotic arm with respect to the other arms based on velocity of the end element on each arm. A velocity controlled motion would enable smoother contact and/or cooperation between machine elements. Therefore, there is a need to configure machine element motion between mechanisms based upon velocities of each working element of the machine.

BRIEF DESCRIPTION OF THE DRAWINGS

Preferred embodiments of the invention are described below with reference to the following accompanying drawings.

FIG. 1 is a schematic side view representation of a multiple drive/multiple output die forming and cutting machine that utilizes a velocity drive control system in accordance with a preferred embodiment of the invention;

FIG. 2 is a graphical user interface on an engineering workstation implementing the velocity drive control system of FIG. 1;

FIG. 3 an enlarged partial view of the graphical user interface of FIG. 2 illustrating a "File Option" control panel;

FIG. 4 an enlarged partial view of the graphical user interface of FIG. 2 illustrating an "Edit Option" control panel;

FIG. 6 illustrates one exemplary velocity profile curve having a bounded area which, when integrated by an integrator determines displacement, then is scaled to match the target displacement of the respective machine component/element.

FIG. 7 is a layout illustrating the assembly of FIGS. 8 and 9;

FIG. 8 is a first portion of FIG. 7 of a second embodiment graphical user interface on an engineering workstation implementing the velocity drive control system of FIG. 1; and FIG. 9 is a second portion of FIG. 7 of a second embodiment graphical user interface on an engineering workstation implementing the velocity drive control system of FIG. 1.

BEST MODES FOR CARRYING OUT THE INVENTION AND DISCLOSURE OF INVENTION

Figure 5:
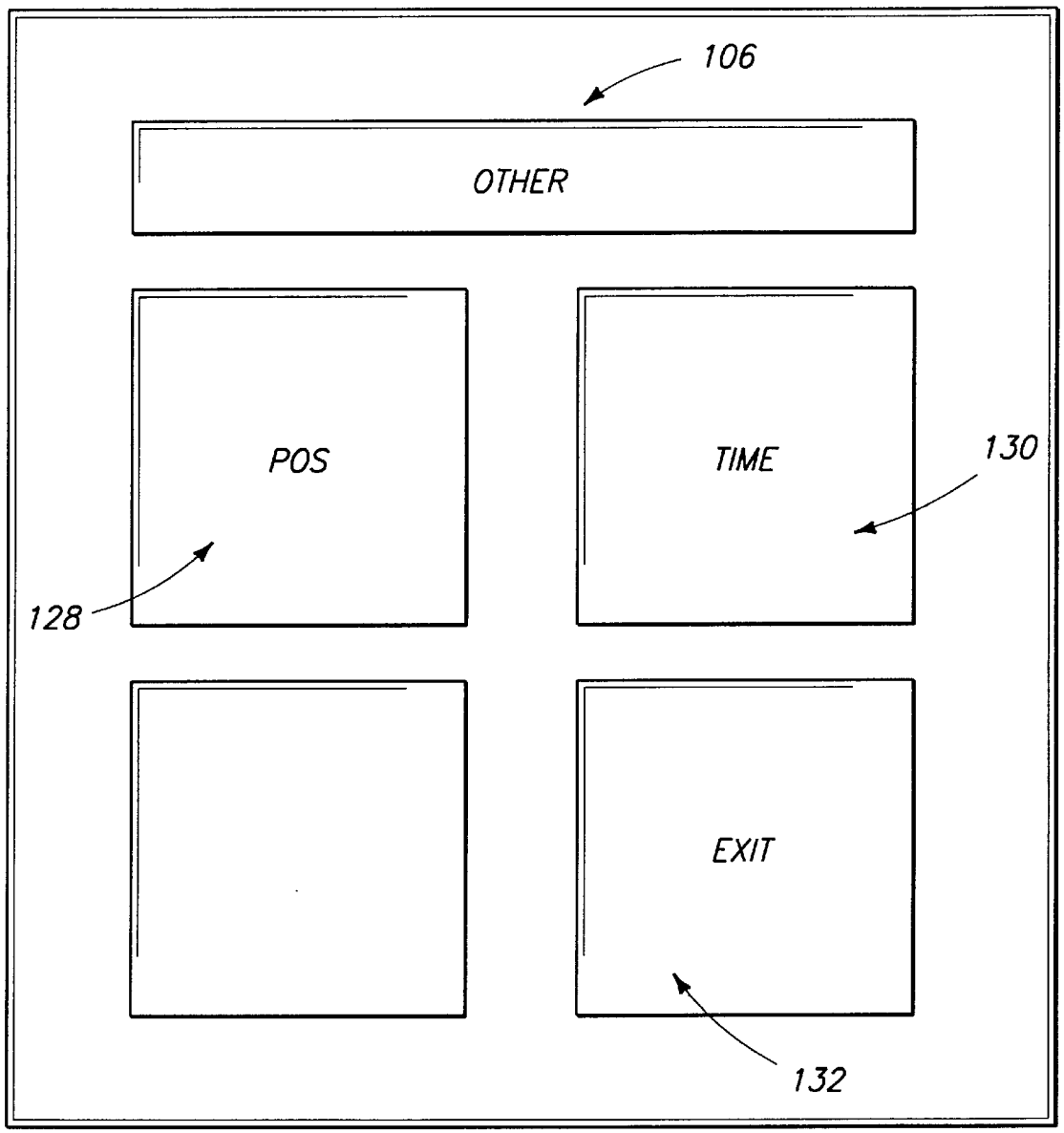
FIG. 5 is an enlarged partial view of the graphical user interface of FIG. 2 illustrating an "Other Function" control panel.

A preferred embodiment of a control for directing multiple drive/multiple output machines for cycle based processes is generally designated with the numeral 10. For purposes of illustration, the multiple drive/multiple output machine is a thermal-forming machine configured for cycle-based operation, designated generally with the numeral 12. Machine control 10 is implemented in a combination of software and hardware on an engineering workstation 14 using a Computer Aided Design (CAD) program 16. Alternatively, a personal computer, a stand-along computer, or a shared computer can be used. Further alternatively, any software program capable of modeling machine kinematics and spatial relationships can be used. Workstation 14 has a central processing unit (CPU) 18, one or more forms of memory 20, software 22 (including a windowing environment 24, interface software 26, and the above CAD program 16), a graphical user interface 28, a keyboard 30, and a mouse 32. One suitable windowing environment is Windows 95™, an operating system introduced by Microsoft Corporation, of Redmond, Wash. Another suitable windowing environment is Windows™3.X (e.g., 3.1), running on DOS, and was used to implement the embodiment of FIGS. 2–5. One suitable CAD program configured to run on a Windows™ environment is AutoCAD®, release number 11, sold by Autodesk, Inc. of Sausalito, Calif. Such environment is used to realize the embodiment of FIGS. 7–9. Alternatively, any computer operating system suitable for use with a user interface such as a graphical user interface can be used.

Thermal forming machine 12 includes a thermal forming rotary press 34 and a feeding conveyor 36. Press 34 is raised and lowered onto a web 38 of plastic material to be formed by the operation of a servo drive 40. Drive 40 comprises an AC servomotor and a computer controlled servo drive motor controller. The web of material is fed into press 34 from a roll 42, guided by rollers 44 that are driven with another servo drive 46. Drive 46 is constructed similarly to drive 40. In operation, it becomes necessary to choreograph motions of the press 34 and conveyor 36 in order to optimize the production rate of parts being formed in machine 12. For example, conveyor 36 is operated to feed web 38 when press 34 is open, allowing feeding of new material to be formed within the press. However, conveyor 36 is stopped when the press is closed, or nearly closed. Therefore, it is desirable to vary the velocity with which press 34 is opened and closed to allow for more time to feed web 38 during a given cycle time of operation.

Thermal-forming press 34 has a platen 48 that is movable between opened and closed positions by rotary servo drive 40. Platen 48 engages against bolster plate 50 when moved to the closed position. Drive 40, which forms the motor and controller for driving the press, attaches to a crank arm 52 that moves the platen up and down as the drive rotates. Typically, a single revolution of drive 40 produces a corresponding complete press cycle, returning the press to a starting, or closed position. For example, when drive 40 is at an initial rotated position of 0 degrees, the press is closed onto the web 38. Similarly, when drive 46 is rotated to 180 degrees, platen 48 is opened completely. Platen 48 is slidably carried by four guide pins 54 supported vertically from bolster plate 50. Bronze guide bushings 56 are mounted and arranged in platen 48 to slidably receive each pin 54. Additionally, drive 40 and a driven end of crank arm 52 are supported by mounting the drive atop an end of one of pins 54.

Thermal forming machine 12 of FIG. 1 is configured to vacuum mold thermal-formed plastic 57 from the web 38 of plastic material as it is passed between the platen 48 and bolster plate 50. A vacuum source 58 applies a vacuum to a heated piece of the web when platen 48 is closed onto bolster plate 50. The vacuum is applied via vacuum holes and feed lines formed within a female mold 60 of platen 48. Vacuum source 58 is preferably formed from a vacuum pump and a pressure vessel in which a vacuum is applied. A thermal heat source 62 is also formed directly within the face of mold 60 from one or more electrical resistance heating elements (not shown). Alternatively, a separate oven can be provided upstream of machine 12, heating web 38 to a desired molding temperature before it is advanced into machine 12.

A web retaining clamp 64 is shown positioned alongside machine 12 of FIG. 1. Clamp 64 fixes web 38 from moving as platen 48 is closed onto the web during heating and vacuum forming steps of operation. While platen 48 is being raised, clamp 64 is released to allow web 38 to be advanced in preparation for a subsequent part forming operation to be implemented by the machine. For example, web 38 can be advanced into a separate trim press where molded parts 57 are cut from the web. A pneumatic solenoid 66 is constructed and arranged to electrically activate vacuum source 58, thereby enabling application of vacuum during part forming by activating the source, and enabling release of vacuum during release of the part 57 by deactivating the source. Similarly, pneumatic solenoid 68 is constructed and arranged to electrically activate and deactivate clamp 64.

In operation, drives 40, 46 and solenoids 66, 68 of FIG. 1 are activated and deactivated according to desired velocity path profiles for drives 40 and 46 by way of machine control 10. Machine control 10 is configured in software to enable a user to draw desired velocity profiles (versus time) for drives 40 and 46 where they are viewed on display 28. Preferably, the profiles are drawn with the aid of a Computer Aided Design (CAD) software package. In the past, drive controls have been used to get a working element to a desired position without any concern over the velocity path that the element realizes in getting to that position. Typically, rotating drives have been driven at substantially constant speeds to produce a desired displacement of a machine element, with the drive being turned off to stop the motion. Therefore, velocity profiles typically could only be changed, or tailored, by modifying the kinematic linkage being driven by the drive.

However, for each moving element of a machine 12, a user inputs a target displacement for a designated moving point of interest on the element into the computer workstation 14 that forms machine control 10. For example, if the fully opened spacing between platen 48 and plate 50 is 30 inches, the target displacement would be 30 inches, since the platen face forms the moving point of interest on the machine. By plotting desired velocity points for each point of interest over time and displaying them on screen display 28, a desired velocity profile curve can be best fitted through the points to easily define a complex velocity profile for each drive 40 and 46 of machine 12. The velocity profile of each drive produces a desired velocity profile for an associated point of interest being driven on the machine.

For example, velocity points 70–77 of FIG. 2 were selected and displayed by a user to define a desired velocity profile 80 for drive 40 as it moves ram 52 and platen 48. Similarly, a velocity profile 82 for drive 46 was also constructed, although the points have been omitted for purposes of clarity. Display 28 is configured as a graphical user interface, enabling visualization of each velocity profile 80 and 82 by a user during configuration. Once defined, the velocity profile, or curve, is displayed, and an integration algorithm is used to calculated the area bounded by the velocity versus time curve. The integration algorithm is provided in software 22, stored in memory (a data storage device), and is implemented via CPU 18 to form an integrator. Such an integrated area defines a derived displacement value of a point of interest on the machine that follows the desired velocity curve, or profile in question. However, the desired velocity profile needs to be adjusted by a scaling factor so that the calculated displacement matches the actual, or target, displacement of the point on a machine element being controlled. For the exemplary case of platen 48 having a 30-inch stroke, the area under curve 80 for a single complete cycle of drive 40 needs to be scaled to equal 30 inches.

Preferably, the desired velocity curve 80 is successively multiplied by scalar quantities that change in magnitude in successively smaller incremental amounts so that the end displacement matches the target displacement. Such a technique involves implementing an incremental search method that detects a change in sign for a value X, between an incremental increase from $X_i$ and $X_i$=Delta X, where $f(X_i)$ *f($X_i$+1)<0. When this condition occurs, a smaller incremental change is implemented, and the process is repeated. Essentially, the weighting factor is successively tuned in smaller increments, enabling even closer scaling of the desired velocity profile to realize an integrated area that matches the actual displacement of the machine point in question.

As shown in FIG. 2, a scaled velocity profile 80 has been constructed for one drive 40 of machine 12. A user can integrate portions of profile 80 to determine displacements of an associated point of interest on the machine. Hence, a user can identify displacement versus time, or displacement versus velocity information. With this information available for drive 40, the user can draw a velocity profile 82 for any remaining points of interest on other moving elements of the machine 12, based on the position of drive 40. Hence drive 46 of conveyor 36 which creates velocity profile 82 can be drawn such that movement of platen 48 via drive 40 does not interfere with feeding of web 38 by conveyor 36. Essentially, this allows a user to draw velocity profiles for drives based on the velocities (or positions) of other drives. A single drive cycle display as pictured in display 28 of FIG. 2 can be used to display any number of velocity profiles, for a machine having a corresponding number of machine element motor drives.

Preferably, a modern rotary electric servo motor drive, or actuating device, is used for drives 40 and 46. Such a drive includes an AC servomotor and an associated servo drive motor controller. For example, one suitable AC motor is sold by Siemens AG, Automation Group, Automation Systems for Machine Tools, Robots and Special-Purpose Machines, P.O. Box 31 80, D-91050 Erlangen, Federal Republic of Germany. Additionally, one suitable servo drive motor controller is sold by Siemens as an analog feed drive including the SIMODRIVE 611-A Transistor PWM Inverters and Motors for AC Feed Drives. Such a drive is a predictable device that can very accurately position a machine element to a desired position at a given time. Preferably, the associated servomotor is a brushless servomotor. Typically, only a nominal allowable following error (+/–FE) is produced by such a drive. Furthermore, activation of associated machine components can be triggered based on velocity or position of a drive, by using the velocity profile (or integrated displacement) of the drive.

For example, a predicted clearance position for platen 48 during closing that is suitable for triggering closing of clamp 64 is depicted in FIG. 2 at start trigger 90. For purposes of reference, start time for velocity profile 80 indicates the 0 degree closed position for drive 40. Time line 84 indicates the 90 degree position of drive 40 as press 34 is opening. Time line 86 indicates the 180 degree position of drive 40 where press 34 is fully open. Additionally, time line 88 indicates the 270 degree position of drive 40 where press 34 is closing. Finally, the end time at point 77 for profile 80 indicates the 360 degree position of drive 40 corresponding to the closed position of press 34 at the start time.

The actual clearance between platen 48 and plate 50 for a rotary position of drive 40 can be predicted by integrating the area of the velocity curve 80 for drive 40 up to the point in time directly of interest. Hence, curve 80 is integrated from the start time up to time line 90 to determine what clearance remains as press 34 closes. Such clearance information is then used to set the position of time line 90, where solenoid 68 is triggered "on" by machine controller 10. Solenoid 68 is then turned off at end trigger 92, upon opening of press 34 sufficient to enable activation of conveyor 36. Essentially, a user is able to predict where a point of interest will be based on the rotated position of the respective motor drive. Similarly, the velocity of the point of interest could be used to determine where to trigger activation/deactivation of associated devices for the machine 12. Furthermore, vacuum source 58 is turned on and off by activation/deactivation of solenoid 66 at start/end triggers 94 and 96, respectively.

In order to place output events at peripheral devices, such as the on/off triggering of clamp 64 and vacuum source 58, an input/output (I/O) table is constructed in the time domain for each drive. Output events, such as triggering of an associated machine device, are then triggered by turning on and off I/O independent of the actual position (or velocity) of a particular drive. Instead, a prediction is made of position (or velocity) from the I/O table and the present time in the machine cycle. The predict-ion is used to trigger activation/ deactivation of the associated machine device.

According to FIG. 2, velocity curve 80 is drawn by placing velocity boundary points 70–77 on display screen 28. Points 70–77 comprise velocity data that at least in part defines the desired velocity versus time profile. Curve 82 is similarly drawn. A third order polynomial approximation (curve fit) is then implemented in software to fit and draw a best-fit curve through (or near) points 70–77. Alternatively, one of several other approximation techniques can be used to best fit a curve to points 70–77 in order to realize the associated desired velocity curve 80. For example, a least-squares, an exponential, a Fourier Series, or another polynomial curve fit (for example, Lagrangian) could be used. The general form for a third order polynomial approximation (and the alternative curve fitting techniques) is readily known in the art, and can be readily obtained from a treatise on mathematics.

Once a user has drawn a candidate velocity curve 80 on display screen 28, the area is integrated and scaled to fit the desired final displacement that is defined by the actual displacement of the point of interest on the machine element being driven. If the resulting candidate velocity curve appears undesirable to a user, from direct observation, or from comparison with other viewed velocity curves for other machine elements, points 70–77 can be moved, other points can be added, or some points can be deleted, as desired by the user. Hence, the user can modify the candidate velocity curve until a suitable curve is realized on display 28. A movable cursor provided by the graphical user interface and viewable on display 28 then triggers display of the corresponding displacement according to where the cursor is positioned on the time line of a velocity curve. Alternatively, a keyboard can be used to key the points into the computer. For example, if the cursor (pointer) is placed at time 1.536 seconds in FIG. 2, the displacement window might display a 36 inch displacement for drive 40. If actual displacement of press 34 is 30 inches at this time, a scaling factor of 30/36 is then multiplied against the entire velocity profile 80, scaling the amplitude accordingly. Such scaled velocity profile, when integrated, would indicate the predicted position of drive 40 at 1.536 seconds.

Velocity profiles, such as profiles 80 and 82, are realized at their respective drives by creating a position versus time table, then downloading the table to a motion card associated with each drive. The overall machine cycle time can then be changed by multiplying the time between position elements (δτ) by some scalar. For example, a user may want an overall cycle to take 15 seconds instead of 10 seconds. Therefore, δτ should be multiplied by 1.5 and downloaded to the motion card, resulting in a 15 second cycle time.

EXAMPLE 1

According to FIG. 2, an exemplary screen display 28 is depicted for a computer monitor on a typical engineering workstation using a CAD program with this invention. An exemplary machine operation cycle is depicted for an example user-interface of the cycle-based control implemented by machine controller 10 (of FIG. 1). A plurality of "AXIS" buttons 98 and "10 POINT" buttons 99 are graphically displayed across the top of screen display 28 in a "DRIVE-IO" sub-menu 100. For purposes of this disclosure, "IO" refers to input/output. Buttons 98 and 99 are graphically selected by turning them on and off with a cursor through use of mouse 32 (of FIG. 1). Alternatively, a touch screen display can be substituted for display 28, enabling a user to directly turn each button on and off. "AXIS" buttons 98 are available for up to seventeen different drives; namely, Drive0–Drive16. For the device of FIG. 1, only two buttons are used to enable and disable set-up features for drives 40 and 46. Similarly, "IO POINT" buttons 99 are available for up to seventeen different machine output devices; namely, Output0–Output16. However, the device of FIG. 1 uses only the first two buttons 99 to turn on and off solenoids 66 and 68 which enable and disable vacuum source 58 and clamp 64, respectively. Furthermore, a left side of display 28 contains a "FILE OPTIONS" sub-menu 102, an "EDIT OPTIONS" sub-menu 104, and an "OTHER" sub-menu 106. Each sub-menu contains buttons for carrying out set-up and operation features for the machine controller. Details of each sub-menu will be described below with reference to FIGS. 3–5.

"DRIVE-IO" sub-menu 100 of FIG. 2 is used to set up control of machine servo drives 40 and 46 to move machine elements, and setup control of solenoids 66 and 68 to enable/disable related machine outputs. An "AXIS" button 98 assigned to drive 40 is selected with a cursor via the mouse, which highlights (depresses) and turns on the selected button 98, enabling the "EDIT OPTIONS" sub-menu 104. The "EDIT OPTIONS" sub-menu includes associated buttons for defining and/or deleting velocity points 70–76 and triggering calculation and display of the best-fit velocity curve 80. An "IO POINT" button 99 assigned to solenoid 66 is selected with the cursor via the mouse, by highlighting (depressing) the button to turn on an associated machine output (such as vacuum source 58). A left mouse button is configured to turn off an assigned output, and a right mouse button is configured to turn on the output.

Referring to FIG. 3, "FILE OPTIONS" sub-menu 102 includes three buttons that are selectable to perform operations on files "loaded to"/"saved from" memory. Memory 20 (of FIG. 1) includes a floppy disk drive that enables loading and saving of machine cycle information to the machine controller 10. A load cycle button 110 is selected with the cursor in order to load a desired machine cycle from a disk. A save cycle button 112 is selected in order to save a newly constructed machine cycle to a disk, and to download the cycle to the controller. A clear velocity button 114 is selected to clear velocity information for selected axes (servo drives), or to clear output information for a selected output.

Referring to FIG. 4, "EDIT OPTIONS" button 104 has six buttons that enable a user to perform editing of velocity boundary points 70–77, curve fitting and scaling of velocity profiles 80, and setting of start and end of selected machine element cycles. An "ADD" button (+) 116 is configured with two operating modes. When an "AXIS" button 98 is selected (turned on), selection of the "ADD" button 116 adds a velocity boundary point 70–77 to a velocity curve being constructed. By positioning the cursor at a desired location and depressing the "ADD" button, the point is added to the curve. When an "IO" button is selected and the "ADD" button 116 is depressed, depressing a left mouse button turns on an output and depressing a right mouse button turns off the output. A "DELETE" button 118 when depressed deletes a cursor selected velocity boundary point 70–77. A "MOVE" button 120 when depressed moves a cursor selected velocity boundary point. A "DRAW" button 122 is depressed to trigger the third order polynomial curve fit through points 70–77 which draws a curve through the points, then scales the curve to realize the desired integrated displacement actually implemented by the machine element in question. A "SET START" button 124 is selected to set the start of motion for a velocity curve being constructed. The cursor is placed at the desired start location on graphics window 108, then button 124 is depressed to select the point. Finally, a "SET END" button 126 is depressed while the cursor is positioned at the desired location, setting the end of the total machine element cycle driven by the drive in question.

FIG. 5 illustrates layout of buttons on "OTHER" submenu 106. A "POSITION" button 128 is depressed to enable a screen-display cursor that indicates position along a velocity profile corresponding to the location of the cursor. A "TIME" button 130 is selected to enable a screen-displayed cursor that indicates time corresponding to the cursor location with respect to a velocity profile. Finally, an "EXIT" button 132 is selected to close the machine cycle presently being displayed by the graphical user interface 28.

FIG. 6 illustrates area 134 bounded by velocity profile curve 82 as it is integrated by the integrator to determine the displacement, but prior to being scaled. One of any available numerical integration routines that is capable of calculating the area bounded by a curve can be used to calculate the resulting displacement. For example, a simple algorithm that sums the area under the curve in discrete sub-sections can be used.

According to one exemplary implementation of an operation cycle for thermal-forming machine 12 in FIG. 1, machine controller 10 is programmed to control operation of a multiple drive/multiple output machine cycle using the configurable velocity profiles of this invention. One "AXIS" button 98 is assigned to Drive0, which enables/disables operation of servo drive 40 to operate rotary press 34. As configured in FIG. 2, rotary press 34 is completely open when drive 40 is at 180 degrees, and is closed when at 0 degrees. A second "AXIS" button 98 is assigned to Drive1, which enables/disables operation of servo drive 46 to operate feed conveyor 36. Drive1 (servo drive 46) advances web 38 for each upcoming forming cycle.

However, the web 38 (product being processed) cannot be advanced until rotary press 34 has raised platen 48 via servo drive 40 at least beyond 90 degrees. Furthermore, conveyor 36 must be completely stopped when servo rive 40 is at 270 degrees. Essentially, when platen 48 of press 34 is moving from 0 to 90 degrees and from 270 to 360 (or 0) degrees, no feeding can occur due to clearance requirements between the press and web. Therefore, it is desirable to move platen 48 as quickly as possible when in these positions in order to maximize the time available in a given machine cycle for transferring web 38 via conveyor 36. Additionally, it is desirable to slow platen 48 down from 90 to 270 degrees in order to allow feed conveyor 36 enough time to complete the feed of new web material into the press for the next cycle of operation for the press.

Once velocity profile 80 for press 34 has been drawn into place, the velocity profile 82 for conveyor 36 is easily drawn by a user with the aid of the visual assistance of display 28 (of FIG. 2). A user can readily see the overlaid velocity profiles, or curves, 80 and 82 on display 28, enabling construction and placement, one with the other(s), to prevent undesirable motions with respect to each other. As can be clearly seen in FIG. 2, velocity profile 82 has been constructed and displayed against velocity profile 80 so that feed conveyor 36 moves web 38 only within the required 90 to 270 degree positions of servo drive 40 and press 34.

Additionally, according to FIG. 2, air solenoid 68 is turned on when rotary press 34 reaches 90 degrees, closing clamp 64. Solenoid 68 is turned off when press 34 reaches 270 degrees. To turn the solenoid on, an "I/O POSITION" button 99 is selected, and the left mouse button is used to set a start trigger 90 at the rotary press's 90 degree mark. To turn the solenoid off, the right mouse button is used to set an end trigger 92 at the rotary press's 270 degree mark. Near the end of the machine element cycle defined by velocity profile 88, solenoid 66 is turned on when rotary press 34 is nearly closed. In this manner, a vacuum is applied by vacuum source 58 onto web 38 just prior to the beginning of the next machine cycle. Solenoid 66 is turned off just after the next cycle begins. The left and right mouse buttons are then used to set a start trigger 94 and an end trigger 96. Finally, the end of the entire machine cycle is defined by selecting an end of cycle mark 144. The end of cycle mark is set by selecting the "SET CYCLE END" button 126 and clicking on the left mouse button at the selected location. As shown in FIG. 2, mark 144 is located at 2.400 seconds, which allows for a 100 millisecond form time for thermal forming machine 12.

FIGS. 7–9, when assembled together according to the layout of FIG. 7, illustrate a second embodiment graphical user interface implemented on a personal computer. The graphical user interface of FIGS. 7–9 is implemented in Windows 95™. Display 128 enables drag and drop capabilities when configuring desired velocity profiles and enabling/disabling desired axes and IO devices. Generally, the velocity profiles for a thermal former and a feed device are depicted in overlay. Additionally, vacuum and form air features can be overlaid at desired locations with respect to the velocity profiles, enabling activation/deactivation of related IO devices. An axis list 198 for selecting the desired machine axis is set up in the form of a scroll bar. Similarly, an IO list 199 is also set up in the form of a scroll bar. A user merely uses a mouse to pick the desired item from each list by scrolling up or down through the list of options. A heading bar 200 enables display of a Customer name and/or a machine name to be controlled by the servo drive system of this invention. A menu bar 202 enables selection of previously constructed velocity profiles (recipes) saved in memory, selection of particular machine setups saved in memory, configuration of IO devices such as heating elements of an oven, controller setup, IO setup, memory configuration and maintenance, etc. Button bar 206 enables the turning on, or start up of a machine being controlled by the servo controlled system of this invention, as well as turning on of associated IO device, such as heat. Button bar 208 enables display of desired functional or data features being displayed graphically via display 128, or being implemented via the controller.

Even further, the velocity profiles of this invention could easily be created in velocity versus position, then converted based upon operating speed of a motor being realized via a controller. Even further, conversion could be made to depict acceleration versus time for each point of interest on the machine being controlled.

What is claimed is:

1. A machine control apparatus, comprising:
   processing circuitry;
   a user interface communicating with the processing circuitry and configured to receive user input commands defining at least in part a desired velocity versus time profile of a point of interest on a machine;
   a data storage device configured to store user input commands and a target displacement value for the moving point of interest, the target displacement value associated with an actual physical displacement of the point of interest on the machine;

an integrator communicating with the processing circuitry and configured to integrate the desired velocity versus time profile and derive a displacement value for the moving point of interest;

a comparator communicating with the processing circuitry and configured to compare the target displacement value with the derived displacement value for the point of interest; and the comparator configured to output a scaling factor calculated by the processing circuitry and operative to scale the velocity profile to realize the target displacement value as integrated over a time domain of interest.

2. The machine control system of claim 1 wherein the data storage device is configured to store at least one previously constructed velocity versus time profile, and wherein the velocity versus time profile comprises user inputs.

3. The machine control apparatus of claim 1 wherein the data storage device is further configured to store configuration settings for at least one input/output device.

4. The machine control apparatus of claim 1 wherein the data storage device is further configured to store setup values on the machine.

5. A method for controlling a processing machine, comprising:

providing a working element of the processing machine and a motor drive configured to move the working element;

characterizing a desired velocity profile for a desired point on the working element corresponding to operation of the motor drive;

integrating the characterized velocity profile over a desired period of time to characterize a derived displacement value;

providing a target displacement value for the desired point;

comparing the target displacement value with the derived displacement value to obtain a scaling coefficient sized to scale the derived displacement to realize the target displacement; and scaling the desired velocity profile such that, when integrated, the velocity profile provides the actual displacement for the working element.

6. The method of claim 5 further comprising storing the desired velocity profile in the memory.

7. The method of claim 5 wherein scaling the desired velocity profile comprises applying a scaling factor to the desired velocity profile such that, when integrated, the velocity profile provides the actual displacement.

* * * * *

UNITED STATES PATENT AND TRADEMARK OFFICE
CERTIFICATE OF CORRECTION

PATENT NO. : 6,242,877 B1
DATED : June 5, 2001
INVENTOR(S) : Jere F. Irwin et al.

It is certified that error appears in the above-identified patent and that said Letters Patent is hereby corrected as shown below:

Column 3,
Line 45, delete "a stand-along computer," and insert -- a stand-alone computer --.
Line 57, delete "and was used to", and insert -- which was used to --.

Column 5,
Line 36, delete "is used to calculated", and insert -- is used to calculate --.

Column 6,
Lines 5-6, delete "Hence drive 46", and insert -- Hence, drive 46 --.

Column 7,
Line 65, delete "and "10 POINT" buttons", and insert -- and "IO POINT" buttons --.

Column 9,
Line 38, delete "button 98 is assigned to Drivel,", and insert -- button 98 is assigned to Drive1, --.
Line 40, delete "Drivel (servo drive 46)", and insert -- Drive1 (servo drive 46) --.
Line 45, delete "when servo rive 40 is", and insert -- when servo drive 40 is --.

Column 10,
Line 38, delete "display of a Customer name", and insert -- display of a customer name --.

Signed and Sealed this

Fifteenth Day of January, 2002

*Attest:*

*Attesting Officer*

JAMES E. ROGAN
*Director of the United States Patent and Trademark Office*